United States Patent [19]

Taphorn et al.

[11] Patent Number: 5,433,117
[45] Date of Patent: Jul. 18, 1995

[54] ULTRASONIC GAS METER

[75] Inventors: Werner Taphorn, Sevelten; Alf Zips, Osnabrück; Manfred Bünnemeyer, Lohne; Veit Middelberg, Hagen a.T.W.; Andreas Kammerahl, Lemförde, all of Germany

[73] Assignee: G. Kromschroder Aktiengesellschaft, Germany

[21] Appl. No.: 92,258

[22] Filed: Jul. 15, 1993

[30] Foreign Application Priority Data

Jul. 23, 1992 [DE] Germany ............... 42 24 372.6

[51] Int. Cl.⁶ ............................................. G01F 1/66
[52] U.S. Cl. ......................... 73/861.28; 73/861.27
[58] Field of Search ........... 73/861.31, 861.29, 861.28, 73/861.27

[56] References Cited

U.S. PATENT DOCUMENTS

| | | | |
|---|---|---|---|
| 3,771,117 | 11/1973 | Shaffer et al. | 73/861.27 |
| 4,144,752 | 3/1979 | Lolk | 73/861.28 |
| 4,325,262 | 4/1982 | Meisser et al. | 73/861.28 |
| 4,365,518 | 12/1982 | Zacharias, Jr. | 73/861.31 |
| 4,417,480 | 11/1983 | Zacharias, Jr. | 73/861.27 |
| 4,475,406 | 10/1984 | Ansaldi et al. | 73/861.29 |
| 4,480,486 | 11/1984 | Meisser et al. | 73/861.28 |
| 4,506,552 | 3/1985 | Brown et al. | 73/861.28 |
| 4,523,478 | 6/1985 | Zacharias, Jr. | 73/861.28 |
| 5,243,863 | 9/1993 | Gill | 73/861.28 |

Primary Examiner—Richard E. Chilcot, Jr.
Assistant Examiner—Ronald Biegel
Attorney, Agent, or Firm—Blakely, Sokoloff, Taylor & Zafman

[57] ABSTRACT

The meter has a housing with an inlet and an outlet. The housing is divided between the inlet and the outlet by a partition wall through which a measuring tube with a rectangular cross-section passes. Gas flows through the measuring tube, through which ultrasonic pulses are simultaneously transmitted by transducers disposed on the end walls. The flow rate of the gas is determined from the difference in the time of flight of the bidirectional sound pulses. The gas is directed into the measuring tube through two guidance ducts which run along both longitudinal sides of the measuring tube. Said guidance ducts are also rectangular in cross-section and each contain a flow rectifier.

26 Claims, 3 Drawing Sheets

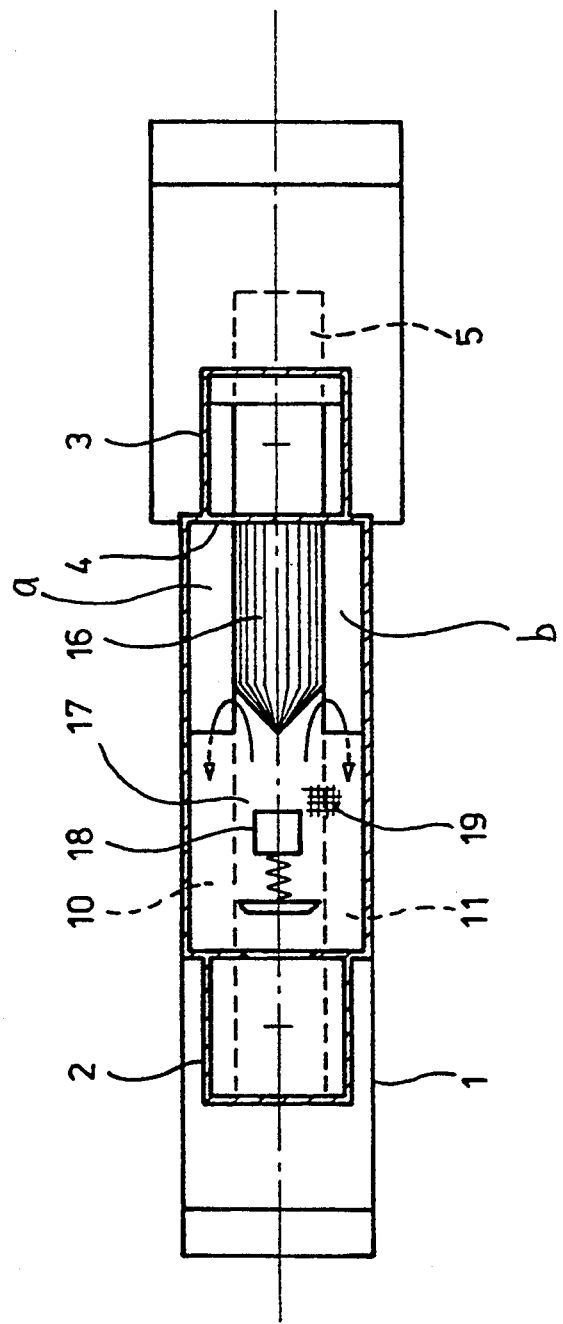

ULTRASONIC GAS METER

BACKGROUND OF THE INVENTION

1. Field of the Invention

The present invention relates to an ultrasonic gas meter with a housing having an inlet and an outlet, a partition wall arranged between the inlet and the outlet and dividing the housing, a measuring tube passing through the partition wall and having an inlet aperture on one end and an outlet aperture on the other end wall, ultrasonic transducers disposed on the inlet side upstream of the measuring tube and on the outlet side downstream of the measuring tube and at least one guidance duct running along the measuring tube, said guidance duct being connected on the inlet side with the housing inlet and on the outlet side with the inlet aperture of the measuring tube.

The two transducers function as both emitters and detectors. The volume of gas flowing through the meter is determined by measuring the time of flight of ultrasonic signals transmitted and received in both directions.

2. Prior Art

With a known flowmeter of the afore-mentioned type (EP 0479434 A1) the measuring tube is circular in cross-section and arranged centrally in the guidance duct. The transducers on the end walls are disposed in chambers which are sealed on all sides and which only have an aperture screened by a mesh in the wall adjacent to the measuring tube. The object of this design is to achieve a coupling of the substantially plane waves in the measuring tube.

However, the chambers lead to considerable losses of sound energy. This in turn leads to a reduction in measuring accuracy. Moreover, the known design is complicated. In particular, the chambers have to be lined with sound-absorbing material. Further, a space-saving design is not possible.

THE INVENTION

It is an object of the invention to develop a gas meter of the afore-mentioned type which operates with high measuring accuracy whilst having a simple and space-saving design.

This object is achieved by the ultrasonic gas meter according to the invention wherein the measuring tube is rectangular in cross-section and is provided with two guidance ducts, each running along one of the longitudinal sides of the measuring tube.

The gas stream entering the meter is split to flow through the two guidance ducts and then passed into the measuring tube from both sides symmetrically. The rectangular cross-section of the measuring tube results in substantially only plane waves being allowed through the measuring tube at the selected sound frequency. The modulations occuring particularly at high flow rates are suppressed. This miniraises resulting signal distortions which otherwise cannot be compensated during electronic signal evaluation. Furthermore, the rectangular cross-section of the measuring tube leads to unidirectional flow due to the limitation of macroscopic turbulence. This reduces the susceptibility of the flow to asymmetric flow profiles caused by a gas meter being installed. It has been found that a cross-section width of approx. 5 mm produces excellent measuring results. The cross-section height, i.e, the length of the longitudinal sides of the measuring tube cross-section, depends on the diameter of the transducer. The design according to the present invention is simple and the meter is small in size. The gas meter is particularly suitable for residential appliances with a measuring range of 1:150. The cross-section of the measuring tube need not necessary be rectangular in form. However, the longitudinal sides of the guidance ducts must be flat, at least in the inlet area of the measuring tube.

According to a particularly advantageous feature each guidance duct has a rectangular cross-section, one of its longitudinal sides lying on the relevant longitudinal side of the measuring tube, at least in the area of the outlet. The fact that the guidance ducts also have a rectangular cross-section also increases the effect of unidirectional flow. It is further suggested that the guidance ducts contain rectifiers which run parallel to the measuring tube, at least in the area of the outlet. The rectifiers effect an additional reduction in cross-flows and turbulences.

In a major embodiment of the present invention the gas meter is characterized by flow diversion means in the area of the inlet and outlet apertures of the measuring tube. These means minimise pressure losses and prevent the occurrence of edge drag.

It is particularly advantageous that in the area of the inlet aperture of the measuring tube the longitudinal sides of the guidance duds remote from the measuring tube are connected with each other by an arch-shaped wall containing the relevant transducer. Said wall promotes the gentle symmetrical diversion of the two side streams, the rectifiers of the guidance ducts preferably extending past the inlet end of the measuring tube.

Further, it is advantageous that the outlet end of the measuring tube extends into a chamber whose end wall containing the relevant transducer is concavely curved. The gas stream leaving the measuring tube can therefore flow around the measuring tube on all sides thus permitting substantially loss-free pressure recovery. Given a maximum flow rate of 6 $m^2$/hr the total pressure loss can be kept well below 2 mbar.

In a further embodiment of the invention it is suggested that the cross-section of the measuring tube continually increases at its outlet end, preferably in the transverse direction and the measuring tube may take on a round cross-section. This leads to a reduction in velocity upstream of the outlet aperture and thus to a minimisation of the sound beam dispersion occurring particularly at high velocities.

As a further measure to improve aerodynamics, it is suggested that the inlet and outlet apertures of the measuring tube form round edges and thus prevent the occurrence of vortices around the edges.

It is a fundamental object of the present invention to work in the measuring tube with maximum velocities as this leads to a high time resolution of the flow. The upper limit is determined by the admissible pressure loss. Under these aspects the flow cross-section is preferably reduced at the transition between the guidance ducts and the inlet aperture of the measuring tube. The resultant acceleration of the flow in this area also ensures that no dust particles can settle in the area of the relevant transducer.

A flow divider is preferably provided upstream of the guidance ducts, said flow divider effecting equal distribution of the flow to the guidance ducts. The flow divider operates in an area of low flow velocity and therefore does not contribute significantly to an increase in pressure losses.

In a further embodiment of the invention the gas meter is charactedsed by an inlet duct of enlarged cross-section leading from the housing inlet to the guidance ducts. This inlet duct calms the flow and thus helps to make the gas meter independent of the installation conditions. Furthermore, the inlet duct may advantageously serve to accommodate a safety shutoff valve and for dust filtering, in particular at the corresponding roughened wall surfaces.

The design may be optimised by limiting one side of the inlet duct by a transverse side of the measuring tube and a transverse side of each of the two guidance ducts. The profile of the inlet duct therefore lies over the square profile formed by the guidance ducts and the central measuring tube. For transfer of the gas flow from the inlet duct into the guidance ducts recessed apertures are provided in the relevant transverse sides, preferably directly upstream of the padition wall dividing the housing. In the middle between these apertures the flow divider is accommodated, in the centre of the top side of the measuring tube.

The inlet duct is preferably longer than the chamber assigned to the outlet end of the measuring tube. In this manner the inlet duct allows for the sensitive flow conditions in the inlet area whilst the chamber on the outlet side only has to guarantee virtual loss-free pressure recovery. The net result is a gas meter which is very small in size.

In a major embodiment of the invention the distance between the inlet and outlet apertures of the measuring tube and the relevant transducers is determined by the nearfield length of the sound fields. The side lobes occurring in the near field can therefore not enter the measuring tube. Therefore defined sound fields occur in the measuring tube, which contributes towards a reduction in intensity losses in the measuring tube.

A major problem which occurs not only with the inventive rectangular cross-section of the measuring tube but also with measuring tubes with other cross-sections is the sound beam dispersion to be observed particularly at high flow velocities. This leads at the inlet aperture of the measuring tube to the direction of wave propagation receiving a speed component directed radially inwards which makes no contribution to the difference in the time of flight. To combat this effect it is advantageous for the transducer on the inlet side to be provided with a convexly curved sound surface. At the outlet aperture of the measuring tube the conditions are exactly the reverse. The sound beam dispersion produces a speed component of the wave vector directed radially outwards which also makes no contribution to the difference in the time of flight of the sound pulses. Here it is advantageous if the transducer on the outlet side has a concavely curved sound surface.

In a major embodiment of the invention the inside wall of the measuring tube is provided at least partly with a surface structuring which may also be designed as a reflecting surface. From the flow aspect this surface structuring means that no laminar flow profile forms at low speeds and the degree of flow turbulence is increased. This minimizes the dependency of measuring accuracy on the Reynolds number and thus on the flow profile. From the acoustic aspect, it results in a reduction in sound dissipation in the measuring tube which increases the sound intensity compared with a smooth tube wall. The design of the wall structuring may advantageously be such that it prevents sound waves of higher-order modes caused by interferences or at least greatly diminishes such waves. The surface structuring may be provided only on certain sections of the tube inside surface or may cover the entire surface.

In addition the measuring tube may also be provided with flow and sound beam guidance means. These means reduce macroscopic turbulence without impeding the sound beam. Further, sound waves of higher-order modes may be diverted by such means so that they are not received by the transducer at the same time as the direct pulse.

The advantages of surface structuring are not affected by the cross-section form of the measuring tube. This aspect of the invention is significant not only for a rectangular measuring tube.

The form of surface structuring is selected as a function of the peripheral conditions of the sound field and the duct geometry. It has proved particularly advantageous to have a regular surface structuring, preferably in the form of a thread-like pattern.

Further, it has been found that the height of the surface structuring is preferably in the range of some wave lengths of the sound wave. The reflecting power of the surfaces is in any case important.

Summa summarum, the invention minimises the negative influence of sound entrainment and enlargement of the lobe on measuring accuracy as well as the effects of different flow profiles and inlet flow conditions.

Combinations of the inventive features which differ from the combinations mentioned hereinabove are understood to be disclosed as essential features of the present invention.

BRIEF DESCRIPTION OF THE DRAWINGS

FIG. 6 shows a sectional view taken along line VI—VI in FIG. 1.

DETAILED DESCRIPTION OF THE INVENTION

The present invention will now be described by way of example with reference to the accompanying drawings.

Figures 1, 2:
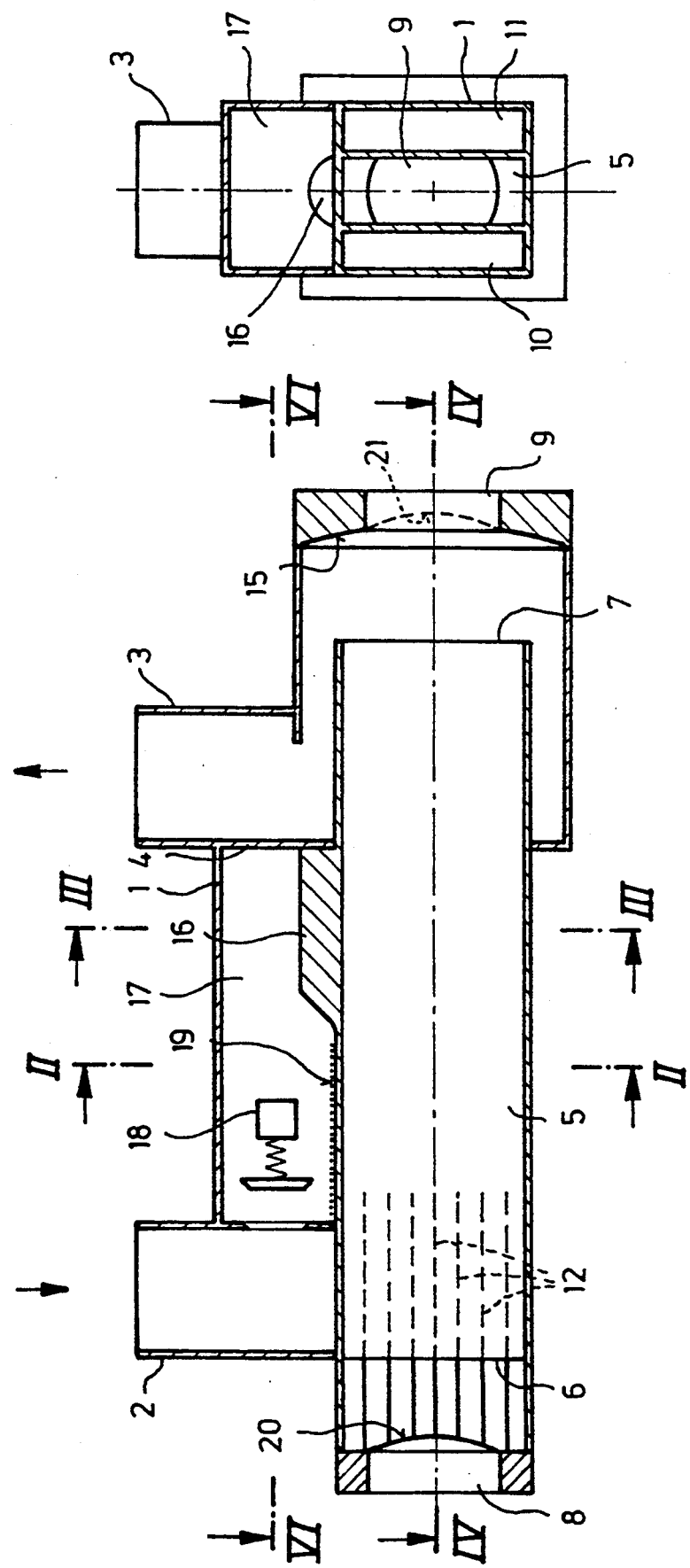
FIG. 1 shows a vertical section through a schematic of a gas meter according to a first embodiment of the invention.
FIG. 2 shows a cross-section taken along the line II—II of FIG. 1.

Referring to FIG. 1, the ultrasonic gas meter has a housing 1 with an inlet 2 and an outlet 3. Between the inlet 2 and the outlet 3 the housing 1 is divided by a partition wall 4. A measuring tube 5 passes through the partition wall forming an inlet aperture 6 and an outlet aperture 7. An ultrasonic transducer 8 is assigned to the inlet aperture 6 on the end wall and an ultrasonic transducer 9 is arranged on the end wall opposite the outlet aperture 7. The transducers do no have to be symmetrical but may also be disposed eccentrically with regard to the measuring tube. The effect of sound beam dispersion may also be reduced if the transducer axes are slightly offset relative to each other. The transducers 8 and 9 each operate as both transmitters and receivers.

The gas flow is determined from the difference in time of flight between the sound waves moving in the direction of flow and those moving in the opposite direction.

Figure 3:
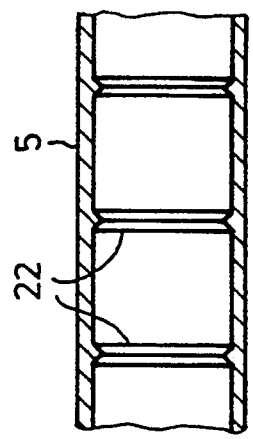
FIG. 3 shows a cross-section taken along the line III—III of FIG. 1.

Referring to FIGS. 2 and 3, the measuring tube 5 is rectangular in cross-section. It allows substantially only plane waves through. At the same time it limits the formation of macroscopic turbulence and therefore acts a flow rectifier. Its width is 5 min.

Figure 4:
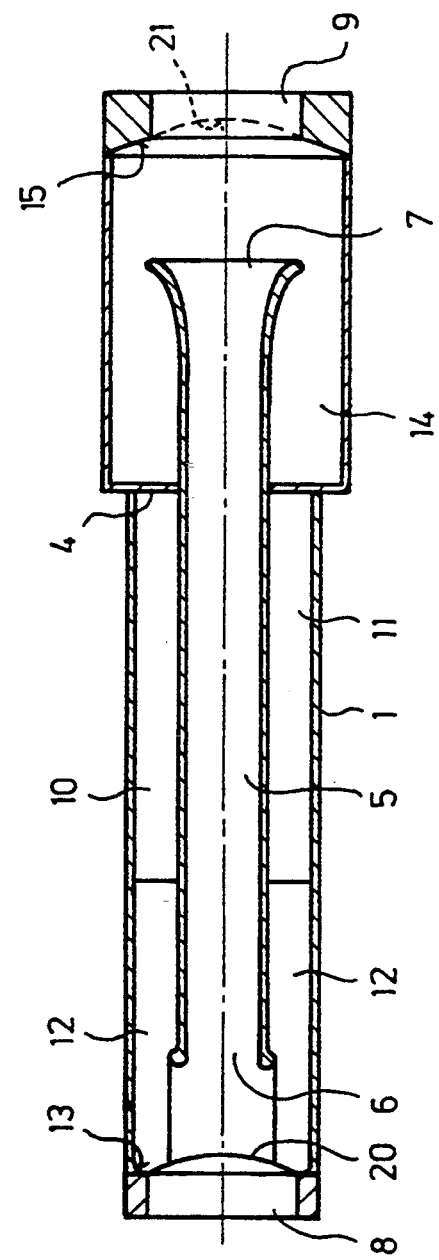
FIG. 4 shows a cross-section taken along the line IV-IV of FIG. 1.

To the sides of the measuring tube 5 run guidance ducts 10 and 11 which establish a connection between the inlet 2 of the housing and the inlet aperture 6 of the measuring tube 5. The guidance ducts 10 and 11 are also rectangular in cross-section and make the flow unidirectional. Unidirectional flow is intensified by a rectifier 12 which extends past the inlet end of the measuring tube 5, as can be seen from FIGS. 1 and 4.

The gas stream leaving the guidance ducts 10 and 11 is diverted by an arch-shaped wall 13 and directed into the measuring tube 5. The aerodynamic design of the flow diverting means is promoted by the inlet aperture 6 having rounded edges. Diversion is substantially without turbulence and without loss of pressure.

Comparable conditions exist at the outlet aperture 7 of the measuring tube 5. Furthermore, the tube cross-section is enlarged at this point in the transverse direction to delay the flow and to minimize sound beam dispersion. An enlargement in the longitudinal direction is also possible as is a transition to a circular profile. The outlet of the measuring tube 5 terminates in a surrounding chamber 14 in which pressure recovery takes place. Diversion of the flow is promoted by a concavely curved end wall 15 of the chamber 14.

A flow divider 16 upstream of the guidance ducts 10 and 11 serves to divide the gas stream entering the gas meter to pass through said two guidance ducts 10 and 11. The flow divider 16 is disposed on the top side of the measuring tube 5 between the apertures assigned to the two guidance ducts 10 and 11 whose location can be seen by comparing FIGS. 2 and 3. The flow divider 16 extends into an inlet duct 17 of enlarged cross-section and is therefore located in the area of low flow velocity. The inlet duct 17 contains a safety shutoff valve 18 assigned to the inlet 2 and also exhibits a roughened wall surface 19 which serves for dust filtering.

The central arrangement of the measuring tube 5 with the two lateral guidance ducts 10 and 11 below the inlet duct 17 results in a highly favourable design. This also applies to the fact the chamber 14 is designed to be shorter than the inlet duct 17.

The distance between the transducer 8 and the inlet aperture 6 of the measuring tube as well as the distance between the transducer 9 and the outlet aperture 7 are determined by the near-field length of the acoustic transducer. Thus, the side lobes cannot enter the measuring tube.

The transducer 8 has a convexly curved sound surface 20 thus compensating sound beam dispersion at the inlet aperture 6. Transducer 9 has a concavely curved sound surface 21 to compensate the sound beam dispersion at the outlet aperture 7. FIG. 6 shows a sectional view taken along line VI—VI in FIG. 1. FIG. 6 shows how the gas flows from the inlet duct 17 through the openings a and b on both sides of the flow divider 16 and enters into the guidance ducts 10 and 11.

Figure 5:
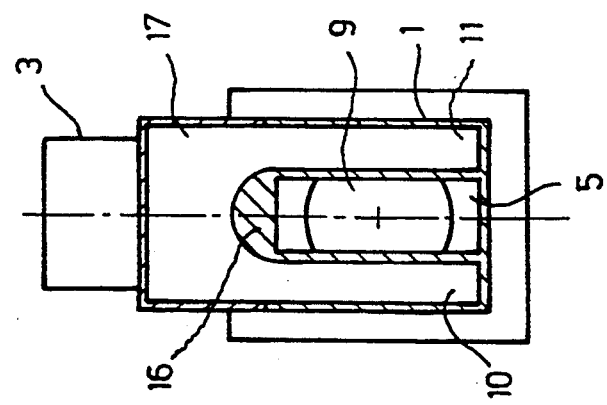
FIG. 5 shows a schematic of a section through a modified embodiment.

In the embodiment according to FIG. 5, the measuring tube 5 is provided with a regular surface structure 22 whose height is in the range of some wave lengths of the sound fields. In this manner the degree of flow turbulence is increased at low flow velocities. Furthermore, the sound dissipation in the measuring tube 5, i.e. the sound attenuation due to interference and the superimposition of sound waves which are not plane is reduced which leads to an increase in sound intensity.

Other modifications are also possible within the scope of the present invention. For example, the guidance ducts 10 and 11 may be designed so that they only run parallel to the measuring tube 5 in the area of the inlet aperture 6 of measuring tube 5. Furthermore, the rectifiers 12 consisting of simple plates as illustrated may be replaced by other rectifying means. Other designs of the flow-diverting means are also possible as long as the flow advantages are retained. Furthermore, the cross-section of the guidance ducts does not necessarily have to be rectangular although the latter is particularly advantageous. The surface structuring 22, which in FIG. 5 consists of concentric profiles triangular in cross-section, may also be designed as a pattern of surface elevations of angular or rounded cross-section in a regular e.g. helical arrangement or also in an irregular arrangement. More important than the space between said elevations is the height of the structuring or roughness referred to the inside surface of the measuring tube, and the reflecting power of the surfaces.

We claim:

1. Ultrasonic gas meter with
   a housing having an inlet and an outlet,
   a partition wall arranged between the inlet and the outlet and dividing the housing,
   a measuring tube rectangular in cross-section passing through the partition wall and having two longitudinal sides disposed opposite each other/and two transverse sides disposed opposite each other as well as an inlet aperture at one end and an outlet aperture at the other end,
   two ultrasonic transducers, one disposed upstream of the inlet aperture and the other disposed downstream of the outlet aperture of the measuring tube,
   and two guidance ducts each connected at one end with the inlet of the housing and at the other end with the inlet aperture of the measuring tube and running along one of the longitudinal sides of the measuring tube.

2. An ultrasonic gas meter as claimed in claim 1, wherein each of the guidance ducts is rectangular in cross-section and has two longitudinal sides disposed opposite each other and two transverse sides disposed opposite each other and wherein one of its longitudinal sides lies on the relevant longitudinal side of the measuring tube, at least in the area of the inlet aperture of the measuring tube.

3. An ultrasonic gas meter as claimed in claim 1, wherein the guidance ducts contain rectifiers which run parallel to the measuring tube, at least in the area of the inlet aperture of the measuring tube.

4. An ultrasonic gas meter as claimed in claim 1, with flow-diversion means in the area of the inlet and outlet apertures of the measuring tube.

5. An ultrasonic gas meter as claimed in claim 4, wherein in the area of the inlet aperture of the measuring tube the longitudinal sides of the guidance ducts disposed remote from the measuring tube are connected to each other by an arch-shaped wall containing the relevant transducer.

6. An ultrasonic gas meter as claimed in claim 5, wherein the rectifiers of the guidance ducts extend past the measuring tube end forming the inlet aperture.

7. An ultrasonic gas meter as claimed in claim 4, wherein the measuring tube end forming the outlet aperture extends into a chamber whose end wall containing the relevant transducer has a concave curvature.

8. An ultrasonic gas meter as claimed in claim 4, wherein the cross-section of the measuring tube continually increases at the end forming the outlet aperture by the distance between the longitudinal sides being enlarged.

9. An ultrasonic gas meter as claimed in claim 4, wherein the inlet and outlet apertures of the measuring tube form rounded edges.

10. An ultrasonic gas meter as claimed in claim 1, wherein the cross-section of the measuring tube is smaller at its inlet aperture than the sum of the cross-sections of the guidance ducts.

11. An ultrasonic gas meter as claimed in claim 1, wherein a flow divider is provided upstream of the guidance ducts.

12. An ultrasonic gas meter as claimed in claim 1, with an inlet duct leading from the housing inlet to the guidance ducts, the cross-section of said inlet duct being larger than the sum of the cross-sections of the guidance ducts.

13. An ultrasonic gas meter as claimed in claim 12, wherein the inlet duct contains a safety shutoff valve assigned to the housing inlet.

14. An ultrasonic gas meter as claimed in claim 12, wherein the inlet duct has a dust-separating means.

15. An ultrasonic gas meter as claimed in claim 14, wherein the inlet duct has at least one roughened wall surface.

16. An ultrasonic gas meter as claimed in claim 12, wherein the inlet duct has one side which is formed by one transverse side of the measuring tube and by one transverse side of each of the guidance ducts.

17. An ultrasonic gas meter as claimed in claim 1, wherein the transducers generate sound fields which define a near-field length and wherein the distance between the inlet and outlet apertures of the measuring tube and the relevant transducer is determined by the near-field length of the sound fields.

18. An ultrasonic gas meter as claimed in claim 1, wherein the transducer assigned to the inlet aperture of the measuring tube has a convexly curved sound surface.

19. An ultrasonic gas meter as claimed in claim 1, wherein the transducer assigned to the outlet aperture of the measuring tube has a concavely curved sound surface.

20. An ultrasonic gas meter as claimed in claim 1, wherein the measuring tube has an inside wall which is provided at least partly with a surface structuring.

21. An ultrasonic gas meter as claimed in claim 20, wherein the surface structuring is regular.

22. An ultrasonic gas meter as claimed in claim 21, wherein the transducers transmit sound waves which define a wave length and wherein the height of the surface structuring is in the range of some wave lengths of the sound waves.

23. An ultrasonic gas meter with
a housing having an inlet and an outlet,
a partition wall arranged between the inlet and the outlet and dividing the housing,
a measuring tube rectangular in cross-section passing through the partition wall and having two longitudinal sides disposed opposite each other and two transverse sides disposed opposite each other as well as an inlet aperture at one end and an outlet aperture at the other end,
two ultrasonic transducers, one disposed upstream of the inlet aperture and the other disposed downstream of the outlet aperture of the measuring tube,
two guidance ducts, each connected at one end with the inlet of the housing and at the other end with the inlet aperture of the measuring tube and running along one of the longitudinal sides of the measuring tube,
a chamber into which the measuring tube end forming the outlet aperture extends, and an inlet duct leading from the housing inlet to the guidance ducts.

24. An ultrasonic gas meter as claimed in claim 23, wherein the inlet duct is longer than the chamber.

25. An ultrasonic gas meter with
a housing having an inlet and an outlet,
a partition wall arranged between the inlet and the outlet and dividing the housing,
a measuring tube passing through the partition wall and having an inlet aperture at one end and an outlet aperture at the other end,
two ultrasonic transducers, one disposed upstream of the inlet aperture and the other disposed downstream of the outlet aperture of the measuring tube,
two guidance ducts, each connected at one end with the housing inlet and at the other hand with the inlet aperture of the measuring tube,
wherein the transducer assigned to the inlet aperture of the measuring tube has a convexly curved sound surface,
and wherein the transducer assigned to the outlet aperture of the measuring tube has a concavely curved sound surface.

26. An ultrasonic gas meter with
a housing having an inlet and an outlet,
a partition wall arranged between the inlet and outlet and dividing the housing, a measuring tube with a rectangular cross section passing through the partition wall and having two longitudinal sides disposed opposite each other and two transverse sides disposed opposite each other as well as an inlet aperture at one end and an outlet aperture at the other end, the longitudinal sides being at least flat in the area of the inlet aperture,
two ultrasonic transducers, one disposed upstream of the inlet aperture and the other disposed downstream of the outlet aperture of the measuring tube,
and two guidance ducts, each connected at one end with the housing inlet and at the other end with the inlet aperture of the measuring tube and running along one of the longitudinal sides of the measuring tube.

* * * * *